UNITED STATES PATENT OFFICE.

JOSEPH W. BLOSSER, OF SARCOXIE, MISSOURI, ASSIGNOR TO HIMSELF AND JACOB BLOSSER, OF SAME PLACE.

IMPROVEMENT IN MEDICAMENTS FOR CATARRH.

Specification forming part of Letters Patent No. 208,064, dated September 17, 1878; application filed April 3, 1878.

*To all whom it may concern:*

Be it known that I, JOSEPH WENGER BLOSSER, of Sarcoxie, in the county of Jasper and State of Missouri, have invented a new and Improved Medical Compound, of which the following is a specification:

The object of my invention is to furnish an effective catarrh remedy, to be utilized either in the form of small cakes by chewing or in the form of medicated fumes by smoking it like tobacco in a pipe or cigarette, and inhaling, swallowing, or blowing out the smoke through the nostrils, or as the state and location of the disease may require.

The invention consists in a compound made of the following ingredients mixed together in about the following proportions, to wit: licorice, eighteen pounds; camomile, twenty-two pounds; cubebs, sixteens pounds; stramonium leaves, fourteen pounds; gum-myrrh, two and one-fourth pounds; gum-camphor, five ounces.

In preparing the compound the licorice is crushed and sifted to remove the dust, the camomile is rubbed to break the heads of the flowers, and its hard cores, stems, &c., are rejected, the cubebs are ground, the stramonium leaves are rubbed to a coarse powder and their stems rejected, the gum-myrrh and gum-camphor are ground in a mortar in the usual manner.

If desired some coloring-matter may be added to the whole compound or to any of its ingredients.

The essential ingredients are the camomile, cubebs, and stramonium. The licorice is used, not on account of its medical properties, but as a combustible material, as it burns more steadily than the other ingredients, thus helping to consume them and render their medical principles volatile.

Having thus described my invention, what I claim as new, and desire to secure by Letters Patent, is—

A medical compound consisting essentially of camomile, cubebs, and stramonium leaves, in about the proportions specified.

JOSEPH WENGER BLOSSER.

Witnesses:
MOSES A. McKNIGHT,
E. D. BARTON.